(12) United States Patent
DeWulf et al.

(10) Patent No.: US 10,276,888 B2
(45) Date of Patent: Apr. 30, 2019

(54) LITHIUM ELECTROCHEMICAL ACCUMULATOR HAVING A TERMINAL DIRECTLY CONNECTED TO THE ELECTROCHEMICAL ASSEMBLY AND ASSOCIATED PRODUCTION METHODS

(71) Applicant: COMMISSARIAT A L'ENERGIE ATOMIQUE ET AUX ENERGIES ALTERNATIVES, Paris (FR)

(72) Inventors: Frédéric DeWulf, Voiron (FR); Marianne Chami, Fontaine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 26 days.

(21) Appl. No.: 15/129,478

(22) PCT Filed: Apr. 8, 2015

(86) PCT No.: PCT/IB2015/052532
§ 371 (c)(1),
(2) Date: Sep. 27, 2016

(87) PCT Pub. No.: WO2015/155698
PCT Pub. Date: Oct. 15, 2015

(65) Prior Publication Data
US 2017/0117575 A1    Apr. 27, 2017

(30) Foreign Application Priority Data

Apr. 8, 2014   (FR) ..................... 14 53088

(51) Int. Cl.
| H01M 10/0525 | (2010.01) |
| H01M 2/26 | (2006.01) |
| H01M 2/30 | (2006.01) |
| B23K 26/24 | (2014.01) |
| H01M 2/02 | (2006.01) |
| H01M 2/06 | (2006.01) |

(Continued)

(52) U.S. Cl.
CPC ........ *H01M 10/0525* (2013.01); *B23K 26/24* (2013.01); *H01M 2/022* (2013.01);
(Continued)

(58) Field of Classification Search
None
See application file for complete search history.

(56) References Cited

U.S. PATENT DOCUMENTS

| 7,335,448 B2 | 2/2008 | Kaito et al. |
| 7,338,733 B2 | 3/2008 | Morita et al. |

(Continued)

FOREIGN PATENT DOCUMENTS

| EP | 1653530 | 5/2006 |
| EP | 1898481 A1 | 3/2008 |

(Continued)

OTHER PUBLICATIONS

International Search Report dated Aug. 17, 2015.
French Patent Application No. 1359223 filed Sep. 25, 2013 (published as FR 3011128).

*Primary Examiner* — Wyatt P McConnell
(74) *Attorney, Agent, or Firm* — Pearne & Gordon LLP (57) ABSTRACT

The present invention relates to a lithium-ion electrochemical accumulator comprising an electrode assembly, a casing arranged to sealably contain the electrode assembly, two current output terminals each connected to one or other of the anode(s) and cathode(s) of the assembly, one of the terminals, called the first terminal, passing through a wall of the casing and being electrically insulated therefrom. According to the invention, the first terminal comprises a first conductive part passing through the casing and comprising a portion at least one region of which is welded directly to the bottom.

18 Claims, 4 Drawing Sheets

(51) Int. Cl.
*H01M 10/04* (2006.01)
*H01M 10/0587* (2010.01)
*H01M 10/052* (2010.01)

(52) U.S. Cl.
CPC .......... *H01M 2/0217* (2013.01); *H01M 2/06* (2013.01); *H01M 2/263* (2013.01); *H01M 2/30* (2013.01); *H01M 10/0422* (2013.01); *H01M 10/0431* (2013.01); *H01M 10/0587* (2013.01); *H01M 10/052* (2013.01); *H01M 2220/30* (2013.01)

(56) References Cited

U.S. PATENT DOCUMENTS

| | | | |
|---|---|---|---|
| 7,348,098 B2 | 3/2008 | Hayashi et al. | |
| 7,887,952 B2 * | 2/2011 | Kim | H01M 2/263 429/174 |
| 2006/0121348 A1 | 6/2006 | Mizutani et al. | |
| 2008/0057392 A1 | 3/2008 | Takamatsu et al. | |
| 2008/0057394 A1 * | 3/2008 | Rigobert | H01M 2/0426 429/164 |
| 2008/0060189 A1 | 3/2008 | Daidoji et al. | |

FOREIGN PATENT DOCUMENTS

| | | |
|---|---|---|
| EP | 2337137 A2 | 6/2011 |
| FR | 2798227 A1 | 3/2001 |
| FR | 2853764 A1 | 10/2004 |
| FR | 2989836 A1 | 10/2013 |
| FR | 3011128 | 3/2015 |

* cited by examiner

LITHIUM ELECTROCHEMICAL ACCUMULATOR HAVING A TERMINAL DIRECTLY CONNECTED TO THE ELECTROCHEMICAL ASSEMBLY AND ASSOCIATED PRODUCTION METHODS

TECHNICAL FIELD

The present invention relates to the field of the lithium electrochemical generators, which operate using the principle of insertion or disinsertion, or in other words intercalation-deintercalation, of lithium into at least one electrode.

The invention relates in particular to the lithium-ion (Li-ion) electrochemical accumulators of high-capacity, typically greater than 10 ampere-hour (Ah), and having a capacity for the flow of strong currents, typically greater than 250 A.

More particularly, it relates to a lithium electrochemical accumulator including at least one electrochemical cell made up of an anode and of a cathode on either side of an electrolyte-impregnated separator, two current collectors, one of which is connected to the anode and the other to the cathode, and a housing having an elongated shape along a longitudinal axis, the housing being arranged to accommodate the electrochemical cell in a sealed manner, and one of the terminals of which passes through a wall of the accumulator such as to be electrically connected to an electrode of the electrochemical assembly.

The housing may include a cover and a container, normally called a cup, or include a cover, a bottom and a lateral casing assembled both to the bottom and to the cover.

The aim of the invention is to improve the energy density and the mechanical strength and to simplify the production of such an accumulator, while providing the latter with optimal sealing and output current intensity.

PRIOR ART

Figure 1A:
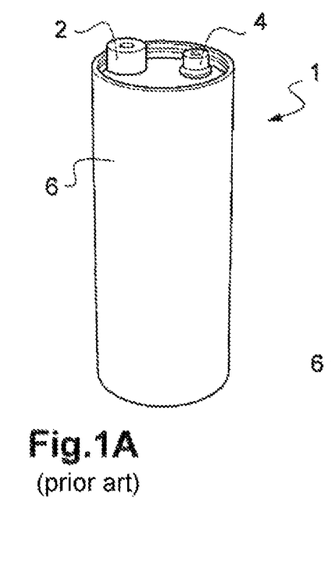
FIG. 1A is a perspective view of a lithium-ion accumulator according to the prior art.
Figure 1B:
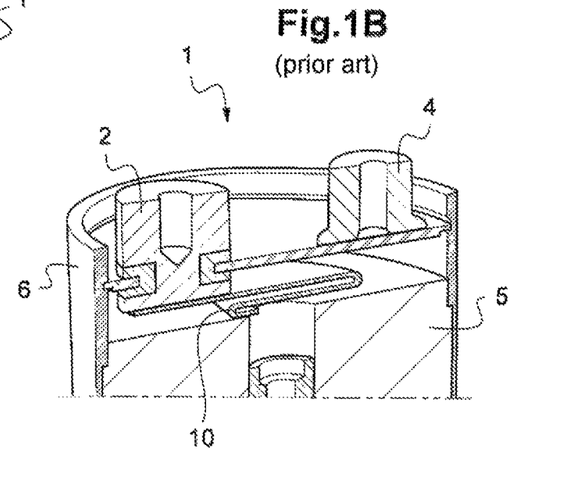
FIG. 1B is an axial section view of a lithium-ion accumulator according to the prior art.

As illustrated schematically in FIGS. 1A and 1B, a lithium-ion battery or accumulator 1 normally includes at least one electrochemical cell made up of a separator impregnated with an electrolyte constituent between a positive electrode or cathode and a negative electrode or anode, a current collector connected to the cathode, a current collector connected to the anode and, finally, a package 6 arranged to contain the electrochemical cell(s) in a sealed manner, while part of the current collectors 2, 4 forming the two current output terminals pass therethrough.

The architecture of the conventional lithium-ion batteries is an architecture that may be described as monopolar, since it has a single electrochemical cell defining an electrochemical assembly including an anode, a cathode and an electrolyte. Several types of monopolar architecture geometry are known:

- a cylindrical geometry, with winding about a cylinder axis as disclosed in the patent application U.S. 2006/0121348,
- a prismatic geometry, with winding about a prism axis as disclosed in the patents U.S. Pat. Nos. 7,348,098, 7,338,733;
- a stack geometry as disclosed in the patent applications U.S. 2008/060189, U.S. 2008/0057392, and U.S. Pat. No. 7,335,448.

The electrolyte constituent may have a solid, liquid or gel form. In this last form, the constituent may comprise a separator made from polymer or from microporous composite soaked with organic or ionic liquid electrolyte(s) which allows the movement of the lithium-ion from the cathode to the anode for charging and conversely for discharging, which generates the current. The electrolyte is generally a mixture of organic solvents, for example carbonates in which a lithium salt, typically $LiPF_6$, is added.

The positive electrode or cathode is made up of lithium cation insertion materials which are generally composite, such as $LiFePO_4$, $LiCoO_2$, $LiNi_{0.33}Mn_{0.33}Co_{0.33}O_2$, placed on a band made of metal material such as aluminum, called a current collector.

The negative electrode or anode is very frequently made up of graphite carbon or from $Li_4Ti_5O_{12}$ (titanate material), possibly also based on silicon or composite formed with a silicon base placed on a band made of metal material, generally made of copper, nickel-plated copper, or aluminum.

A lithium-ion battery or accumulator may, of course, include a plurality of electrochemical cells which are stacked on one another.

Traditionally, a Li-ion battery or accumulator uses a pair of materials at the anode and at the cathode allowing it to operate at a high voltage level, typically equal to 3.6 Volt.

A Li-ion battery or accumulator includes a rigid package when there is demanding target uses with an aim for a long lifespan, typically greater than ten years with, for example, clearly greater pressures to be endured by the housing (vacuum or high excess pressure) and a stricter required sealing level, typically less than $10^{-8}$ mbar·l/s, or in environments with high stresses such as the naval, aeronautical or space field.

Therefore, up to now a rigid package has been formed from a metal housing, typically made from stainless steel (316L stainless steel or 304 stainless steel), from aluminum (Al 1050 or Al 3003) or from titanium.

Currently, two types of rigid housing, such as that with the reference 6 shown in FIG. 1A, are manufactured.

The first type consists of a rigid housing formed with a machined bottom, a lateral casing and a cover that are welded with each other on the periphery thereof using a laser.

The second type also consists of a rigid housing formed with a pressed cup and a cover welded with each other on the periphery thereof using a laser.

As illustrated in FIG. 1B, one of the output terminals 2, generally the negative terminal 2, passes through the housing 6 in an electrically insulated manner and is electrically connected to an electrode, with the same polarity, of the electrochemical assembly 5 by means of an intermediate current collector, in the form of a planar tongue 10 which is folded on itself. The other of the output terminals 4, generally the positive terminal 4, is welded to a wall of the housing 6 which itself is electrically connected to the electrode of the electrochemical assembly 5 having a polarity that is opposite to that of the terminal 2. The feed-through forming the terminal 2 must be perfectly sealed to prevent any leak of the electrolyte out from the housing 6.

The patent application FR 2989836 A1, in the name of the applicant, more precisely discloses such a lithium-ion accumulator housing sealed feed-through.

The patent applications FR 2 853 764 and EP 1 653 530 A1 also disclose a lithium-ion accumulator like that shown in FIG. 1B, i.e. with a housing cover sealed feed-through forming a terminal and a connection between said negative terminal and the electrochemical assembly by means of an intermediate piece in the form of a planar tongue folded on itself. More precisely, the through-terminal is the negative terminal and it is welded to an end of the planar tongue, the other end of which is welded to the uncoated strips of an anode support copper or nickel-plated copper band.

This solution for electrical connection by means of a tongue has disadvantages.

Firstly, the tongue which is folded on itself occupies a height and therefore a volume, that is considerable in the housing along the axis of the accumulator. This substantial volume occupied by the tongue reduces the inner volume of the housing that may be occupied by the electrochemical assembly, and this reduces the energy density of the accumulator. Moreover, the inventors carried out heating tests on a tongue 10 as illustrated in FIG. 1B. The results of these tests at various current values are shown as curves in FIG. 1C. It is stated that the temperature measurements have all been recorded at the center of a copper tongue, the current flow section of which was equal to 7 mm². From these curves, the inventors have deduced that such a tongue 10 was subject to Joule effect temperature increases, which were all the more great since the value of the current passing therethrough was high. Above 250-300 A, the temperature increase experienced by the tongue appears to be unacceptable. The consequences of an excessive temperature increase of the tongue may be disastrous for the accumulator integrity. Therefore, the separator can melt at the end of the electrochemical assembly. The electrolyte can also be heated, the increase in temperature causing an increase in volume along with an increase in the internal pressure of the accumulator.

It is therefore necessary to improve the electrical connection between the terminal passing through a wall of a lithium accumulator and the electrochemical assembly thereof, particularly in order to increase the volumetric energy density of a lithium electrochemical accumulator and to limit the Joule effect heating of the inner parts of the housing, more particularly for high values of current of the accumulator.

DISCLOSURE OF THE INVENTION

To this end, one aspect of the invention relates to a lithium electrochemical accumulator including:
  at least one electrochemical cell made up of a least an anode and a cathode on either side of an electrolyte with which a separator is impregnated, the cell(s) defining an electrochemical assembly having an elongated shape along a longitudinal axis with, at one of the lateral ends thereof, uncoated strips of the anode and, at the other of the lateral ends thereof, uncoated strips of the cathode; at least some of the uncoated strips of the anode or of the cathode of the electrochemical assembly being packed together while forming a base;
  a housing arranged to contain, in a sealed manner, the electrochemical assembly,
  two current output terminals each connected to either of the anode(s) or of the cathode(s), one of the terminals called the first terminal passing through a wall of the housing and being electrically insulated therefrom.

According to the invention, the first terminal includes a first conducting piece, the first piece passing through the housing and including a portion, at least one area of which is directly welded on the base.

"Uncoated strips" means, in this case and within the context of the invention, the portions of the metal foils, also called bands, forming the current collectors, which are not covered with a lithium insertion material. In the remainder of the text, the term "uncoated strip" or "edge" will be used equally to designate an electrode portion as per the definition above.

"Base" means the structure obtained by packing together the uncoated strips.

"Packing together" means a compression along the axis of the electrochemical assembly of a least some of the edges such as to produce a structure having a substantially planar surface, called a base, in order to receive the direct weld of the terminal at the surface thereof. Axial packing together may be carried out one or more times. It may consist of a compression using one or more to and fro relative movements, i.e. at least a return travel along the axis of the electrochemical assembly, until reaching either an electrochemical assembly target dimension along the axis, or a compression maximum force, the value of which is predetermined in advance. Some of the edges may be packed together as described and claimed in the patent application filed in France by the applicant on Sep. 25, 2013 under the number 13 59223.

The invention removes the need for an intermediate piece for electrical connection between the through-terminal and the electrochemical assembly of an accumulator, such as the tongue according to the prior art. Therefore, the disadvantages associated with this intermediate piece are removed. Firstly, the removal of this intermediate piece results in a gain in volume available inside the housing of the accumulator, and therefore the volume energy density of an accumulator according to the invention is increased there compared to those of the prior art. Then, the Joule effect heating of the inner parts of the housing are considerably limited since the heating experienced by the intermediate pieces according to the prior art is removed, and this is all the more advantageous for high values of current of the accumulator.

Preferably, the second terminal is welded to the housing.

According to an advantageous embodiment, the first terminal includes a female second conducting piece, the first piece being male. The accumulator also includes two electrically insulating joints in the form of washers, each including a bearing portion surface-bearing with pressure against one of the faces of the wall of the housing and a guide portion projecting with respect to the bearing portion, the guide portion bearing with pressure against the rim of the through-hole of the wall.

The male piece is press-fitted into the female piece, and each of the conducting pieces includes a bearing portion surface-bearing with pressure against a bearing portion of the washers. According to this embodiment, the female piece furthermore surface-bears with pressure against the guide portions of the washers. The fact that the male piece is press-fitted into the female piece with pressing of the pieces and of the washers against each other allows perfect sealing to be obtained by the wall feed-through forming the terminal.

Preferably, the male and female pieces are welded together by a weld continuous seam. Such an embodiment is advantageous because it allows the mechanical connection between the male piece and the female piece to be strengthened permanently. Furthermore, a weld continuous seam is perfectly sealed and adds to and ensures the perfect sealing of the wall feed-through, for the entire duration of use of a Li-ion accumulator. Apart from sealing, welding ensures the mechanical cohesion with respect to the thermal expansions caused by heating of the terminal under the effect of strong electric currents.

According to an alternative embodiment, the portion of the first piece includes an area of lesser thickness, and the portion is welded to the base at the point of an area of lesser thickness, this area having a thickness e preferably between 0.1 and 0.8 mm, and a width 1 preferably between 0.3 and 2 mm.

According to another alternative embodiment, the area of lesser thickness is an outer peripheral area of the first piece.

Alternatively, according to another alternative embodiment, the area of lesser thickness is an annular peripheral recess.

Preferably, the terminal is welded on the base by laser transmission.

According to a preferred embodiment, the terminals are made of copper or nickel-plated copper.

According to an alternative embodiment, the uncoated strips of a same electrode are connected with each other by at least a weld radial to the axis of the assembly.

According to an advantageous embodiment, the electrochemical assembly is obtained by winding, and the first terminal is welded on the winding axis of the electrochemical assembly.

According to an alternative embodiment, the electrochemical assembly is obtained by winding, and the terminal is welded midway between the winding axis of the electrochemical assembly and the outer periphery of the electrochemical assembly.

According to an alternative embodiment, the accumulator has a generally cylindrical shape.

According to another alternative embodiment, the accumulator has a generally prismatic shape.

Preferably, the materials and the dimensions of the various pieces are chosen to allow the flow of a current having an intensity equal to or greater than 250 A.

The invention also relates to a method of producing an electrochemical accumulator as described above, in which the following steps are carried out:

a. axially packing together, along the axis of the electrochemical assembly (5), at least some of the uncoated strips of a same electrode of the electrochemical assembly in order to create the base, b. positioning the first conducting piece of the first terminal directly on the base, c. welding the first piece directly to the base.

According to an alternative embodiment, the method may further comprise the following steps:

d. positioning two electrically insulating joints in the form of washers on either side of a through-hole of the wall of the housing, e. positioning the second piece of the first terminal through the holes of the washers and the through-hole of the wall of the housing, f. force-fitting the unit made up of the wall, the second piece and the washers on the first piece, g. crimping the first terminal by surface-bearing on the upper surface of the second piece until this upper surface is aligned with the upper surface of the first piece passing through the housing and the washers are axially and radially compressed, h. producing a weld continuous seam between the first piece and the second piece.

DETAILED DESCRIPTION

Other advantages and features of the invention will emerge more clearly upon reading the detailed description of examples of carrying out the invention, which description is given by way of illustration and in a nonlimiting manner with reference to the following figures wherein.

Figure 1C:
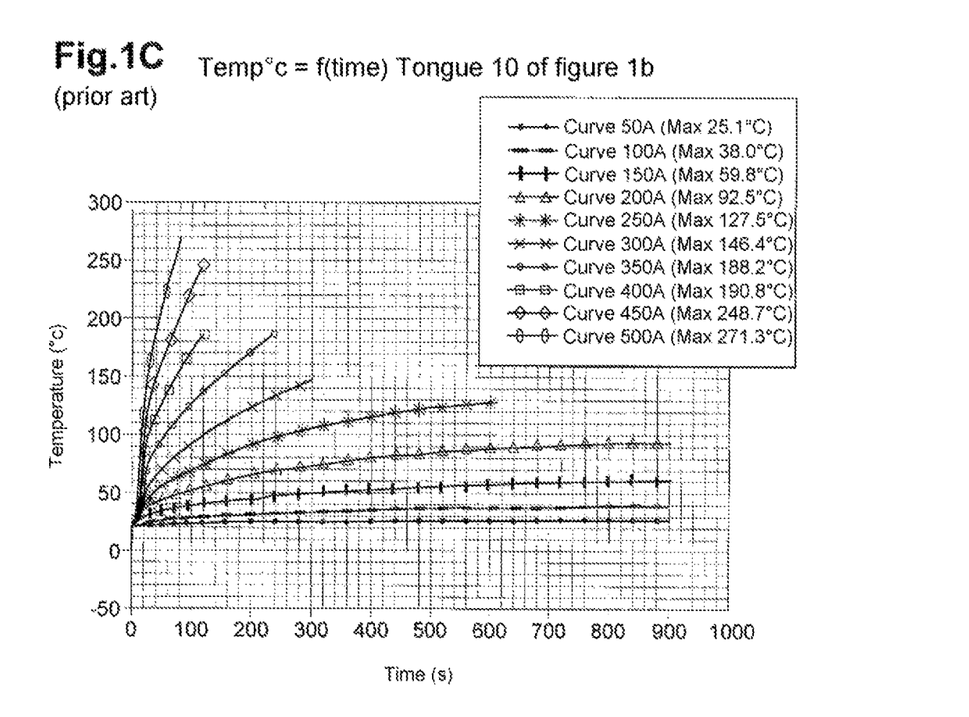
FIG. 1C shows the curves for increase in temperature as a function of the current of a current collector in the form of a tongue connecting the terminal passing through the housing to a polarity of the electrochemical assembly of a lithium-ion accumulator according to the prior art.

FIGS. 1A, 1B and 1C relate to electrochemical accumulators with a terminal passing through a wall of the accumulator according to the prior art. These figures have been mentioned in the preamble and therefore will no longer be mentioned hereafter.

Throughout the present application, the terms "lower", "upper", "low", "high", "bottom" and "top" are to be understood with reference to a Li-ion accumulator housing vertically positioned with the cover thereof on the top and the feed-through projecting outside the housing in the upward direction.

Figure 2A:
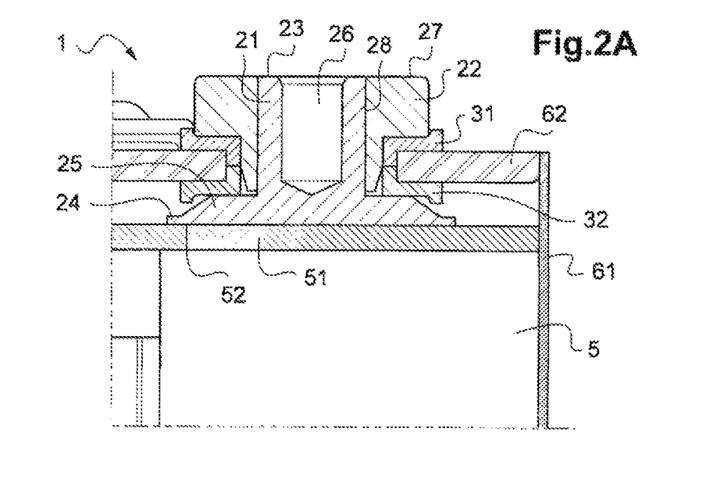
FIG. 2A is a close-up axial section view of the terminal passing through the housing and of the electrochemical assembly of a lithium-ion accumulator according to an embodiment of the invention.
Figure 2B:
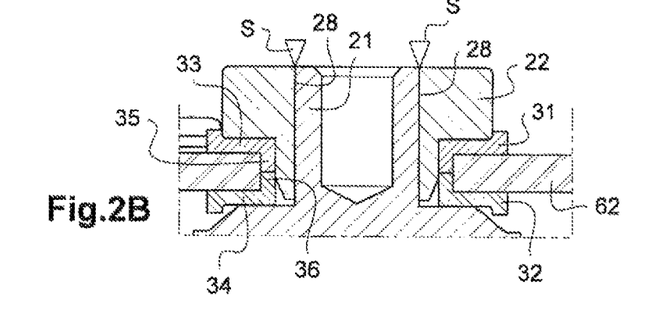
FIG. 2B is a detail view of FIG. 2A.

FIGS. 2A and 2B show an example of a current output terminal 2 passing through a wall of the housing 6 of a Li-ion accumulator 1 according to the invention. In the illustrated example, the terminal 2 passes through the cover 62 of the housing 6 while being electrically insulated therefrom. The terminal 2 may equally pass through another wall of the housing 6, while being electrically insulated therefrom.

The terminal 2 includes two conducting pieces, a male first piece 21, and a female second conducting piece 22. The male piece 21 which extends from the inside of the housing 6 is press-fitted into the female piece 22 which extends from the outside of the housing 6.

The upper surface 23 of the male piece 21, external to the housing 6, is in a same plane as the male piece and the surface 27 of the female piece 22, external to the housing 6. The two conducting pieces 21, 22 are electrically insulated from the cover 62 by two washers 31 and 32, made from electrically insulating material having, moreover, mechanical strength properties suitable for the compression thereof, for example polyetherimide (PEI).

The two washers 31, 32 are accommodated in the through-hole of the cover 62, the washer 31 bearing against the top face of the cover 62 whereas the washer 32 bears against the bottom face of the cover 62. More precisely, the male piece 21 bears with axial pressure along the longitudinal axis of the terminal 2, against the part 34 of the washer 32 itself bearing with axial pressure against the cover 62. Likewise, the female piece 22 bears with axial pressure against the part 33 of the washer 31 itself bearing with axial pressure against the cover 62. The guide parts 35, 36 of the washers 31, 32 bear with radial pressure against the rim of the through-hole of the cover 62. The bearing with axial and radial pressure of the washers 31, 32 against the cover 62 seals the housing 6 at the terminal 2.

As shown in FIG. 2B, a weld seam 28 is produced between the male piece 21 and the female piece 22. The weld seam 28 allows the mechanical connection between the end of the male piece 21 and the bottom of the female piece 22 to be permanently strengthened. Furthermore, a weld continuous seam is perfectly sealed and adds to and ensures perfect sealing of the wall feed-through according to the invention, for the entire duration of use of a Li-ion accumulator. In addition to sealing, the weld ensures the mechanical cohesion with respect to the thermal expansions caused by the heating of the terminal 2 under the effect of strong current.

Figure 3A:
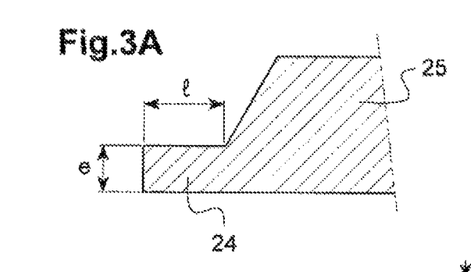
FIG. 3A is an exemplary detail side view according to the invention of an area of lesser thickness of the terminal passing through the housing.
Figure 3B:
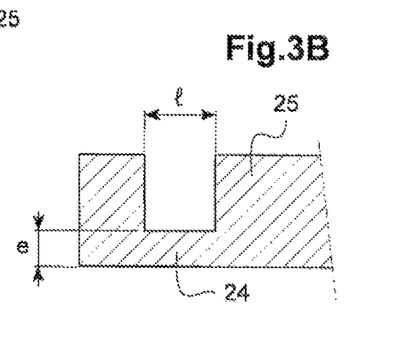
FIG. 3B is an alternative according to the invention of an area of lesser thickness of the terminal passing through a wall of the housing.

The male piece 21 includes a portion 25 arranged inside the housing 6. This portion 25 includes an area of lesser thickness 24 having a thickness e and a width 1. According to a first alternative illustrated in FIG. 3A, this area 24 is an outer peripheral area of the male piece 21. According to a second alternative illustrated in FIG. 3B, this area 24 is an annular peripheral recess. As detailed below, this area of lesser thickness 24 allows the male piece 21 to be laser-welded directly onto the electrochemical assembly 5 according to the invention. The thickness e is preferably between 0.1 and 0.8 mm, and the width 1 is preferably between 0.3 and 2 mm.

Figures 4A, 4B, 5:
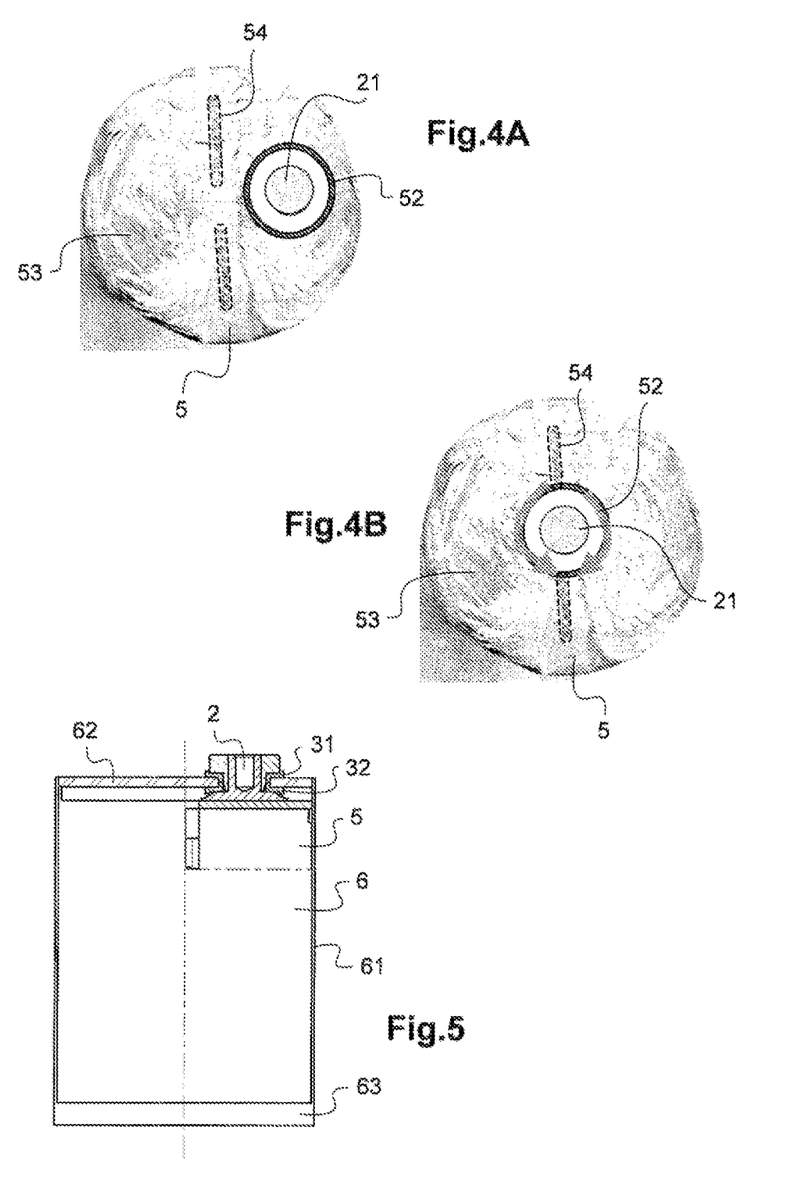
FIG. 4A is a top view of the electrochemical assembly according to an embodiment of the invention.
FIG. 4B is a top view of the electrochemical assembly according to an alternative embodiment, the terminal being placed on the winding axis of the assembly.
FIG. 5 is a side view of an electrochemical accumulator example according to the invention.

The electrochemical assembly 5 of the accumulator 1 is wound and obtained as described and claimed in the patent application filed in France by the applicant on Sep. 25, 2013 under the number 13 59223. As illustrated in FIGS. 4A and 4B, the assembly 5 therefore includes edges 53 of a same electrode, some of which are packed together while forming a base 51. The edges 53 of a same electrode are, moreover, welded to each other by a weld 54, in an area where they have already been folded while being plastically deformed, in a direction radial to the winding axis of the assembly 5. This weld 54 allows the flow of the current to be improved.

According to the invention, the area of lesser thickness is welded on the entire periphery thereof directly to the base 51 along at least one weld line 52. This weld 52 is such that the electrical resistance of the connection between the electrochemical assembly 5 and the male piece 21 does not exceed 50 µOhms. This weld 52 may be continuous along a single line as shown in FIG. 4A, or broken, with, for example, two circular arcs with an angle between 120° and 150° as shown in FIG. 4B.

The terminal 2 may be arranged on the winding axis of the electrochemical assembly 5 as shown in FIG. 4B or between the winding axis of the electrochemical assembly 5 and the periphery thereof as shown in FIG. 4A.

Therefore, according to the invention, the terminal 2 is directly connected to an electrode of the electrochemical assembly 5 then welded directly onto the base 51.

Figure 6A:
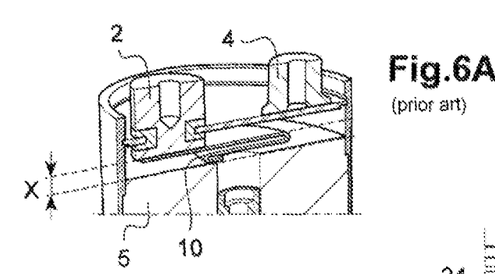
FIGS. 6A and 6B are axial section views at a terminal passing through the housing of an accumulator according to the prior art and according to the invention, respectively, illustrating the gain in volume inside the housing, provided by the invention.
Figure 6B:
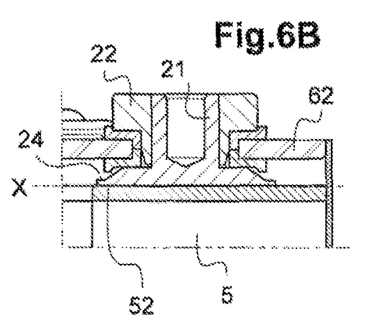

The solution according to the invention with a terminal 2 welded directly onto the electrochemical assembly 5 has several advantages in addition to the sealing already described, which may be listed as follows:

translation abutment of the electrochemical assembly inside the housing, which allows the solution of the normally encountered problem of movement of the electrochemical assembly when the accumulator is subjected to mechanical vibrations or shocks along the longitudinal axis thereof. These mechanical vibrations and shocks are, for example, those of the cycles described by the United Nations standard on the recommendations for the transport of dangerous goods and more specifically the lithium batteries (tests described in the Manual of Tests and Criteria—Section 38.3 entitled "Lithium metal and lithium ion batteries").

an increased rotational mechanical strength of the through-terminal at a large tightening torque, typically greater than 4 N·m, compared to the terminals of the prior art. This large tightening torque may be experienced, for example, at the time of assembling the accumulators in a battery module by means of copper bars or busbars.

a gain in the volumetric energy density (Wh/l) of a Li-ion accumulator. Indeed, the terminal 2 directly welded onto the electrochemical assembly 5 allows a gain in volume to be obtained between the latter and the wall of the housing 6 compared to the electrical connection solutions of the prior art. This advantage is illustrated in FIGS. 6A and 6B. As illustrated in FIG. 6A, an electrical connection according to the prior art, between an electrochemical assembly 5 and a terminal 2 by means of an additional current collector in the form of a tongue 10 folded on itself, involves a height X occupied by the latter with a value between 1 and 5 mm. As illustrated in FIG. 6B, an electrical connection by direct weld of the terminal 2 to the electrochemical assembly 5 according to the invention allows the tongue 10 height to be removed, i.e. to have a zero value X as symbolized by the dotted line. The gain in volume with the solution according to the invention may therefore represent up to 10% of a volume energy gain in a Li-ion accumulator, depending on the sizes thereof a reduction of the internal heating of the accumulator according to the invention. Indeed, the fact of removing an additional current collector according to the prior art, such as the tongue 10, also allows the heating internal to the accumulator which is normally observed during the flow of strong currents, typically greater than 250 A, to be also limited.

Figure 7:
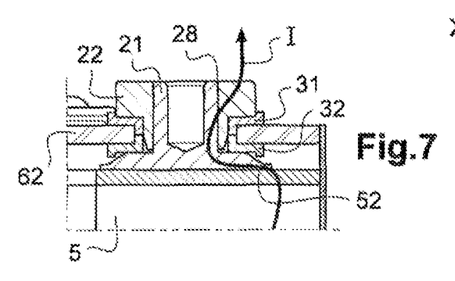
FIG. 7 is an axial section view at a terminal passing through the housing of an accumulator according to the invention, illustrating the path of a high-intensity electric current.

It is ensured that the current flow sections are properly dimensioned firstly in the weld 52 between the male piece 21 and the base 51 of the electrochemical assembly 5 and secondly at the interface 28 between the male piece and the female piece, such as to be able to use the invention for the power accumulators (charge and discharge rate of 10 C-50 C) and high power accumulators (discharge rate >50 C), such that it is possible to conduct currents with an intensity greater than 500 A. The arrow I shows, in FIG. 7, the flow of the current through the weld 52 and the interface 28. As shown in FIG. 5, the cover 62 through which the terminal 2 passes is an integral part of a container having a lateral casing 61. The housing of the accumulator 6 is completely closed in a sealed manner by a bottom wall 63 attached to the container 61, 62 and welded to the latter to the container. The weld between the bottom wall 63 and the lateral casing 61 of the container may be produced by laser welding.

The other current output terminal 4 of the accumulator, which terminal is not a through-terminal, is connected both to a wall of the housing 6, such as the cover 62, for example by welding, and to the edges of the other electrode of the electrochemical assembly 5, which edges are not shown.

Figure 8A:
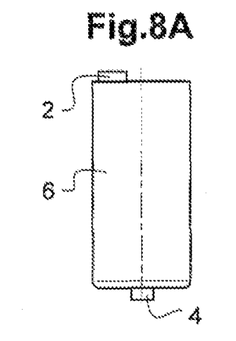
FIGS. 8A-8C are side views of a lithium-ion accumulator with a cylindrically shaped housing illustrating various alternatives for arranging a terminal according to the invention passing through the housing cover and a terminal welded to the housing cover.
Figure 8B:
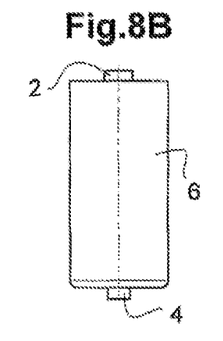
Figure 8C:
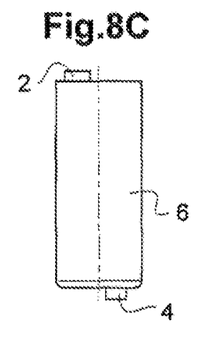
Figure 9A:
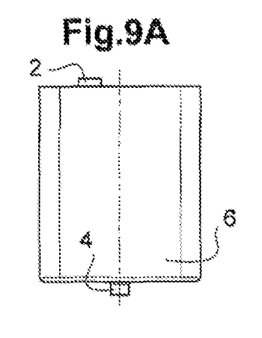
FIGS. 9A-9C are similar to FIGS. 8A-8C with a prismatically shaped housing.
Figure 9B:
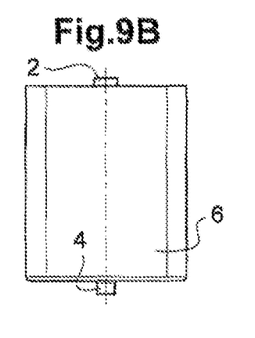
Figure 9C:
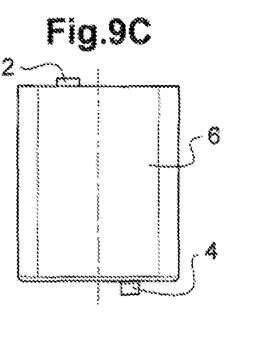

Several types of configuration may be adopted for an accumulator according to the invention for positioning the terminals 2 and 4:

- the terminal 4 supported by the bottom of housing 6 and the through-terminal 2 according to the invention supported by the cover of housing 6 having a cylindrical shape, with the terminal 2 laterally offset with respect to the axis of the housing 6 and the terminal 4 in the axis X of the housing 6 (FIG. 8A), or the two terminals 2, 4 in the axis of the housing 6 (FIG. 8B), or the two terminals 2, 4 laterally offset from the axis of the housing 6 (FIG. 8C);
- the terminal 4 supported by the bottom of housing 6 and the through-terminal 2 according to the invention supported by the cover 62 of housing 6 having a prismatic shape, with the negative terminal 2 laterally offset with respect to the axis of the housing 6 and the terminal 4 in the axis of the housing 6 (FIG. 9A), or the two terminals 2, 4 in the axis of the housing (FIG. 9B), or the two terminals 2, 4 laterally offset from the axis of the housing (FIG. 8C).

To produce a Li-ion accumulator according to the invention as shown in FIG. 5, the following steps are carried out:

a. axial packing together, along the winding axis of the electrochemical assembly 5, of a least some of the edges 53 of a same electrode in order to create the base 51, and possibly welding of the edges with each other along at least one radial weld 54, b. positioning the male piece 21 of the terminal 2 directly on the base 51, according to the position described previously and illustrated in FIG. 4A, c. laser-welding the male piece 21 directly to the base 51 at the area of lesser thickness 24, in order to form the weld 52, d. positioning the two electrically insulating washers 31, 32 on either side of a through-hole of the top wall 62 of the housing 6, e. positioning the female piece 22 through the holes of the washers 31, 32 and the through-hole of the wall 62, f. force-fitting the unit made up by the wall 62, the female piece 22 and the washers 31, 32 onto the male piece 21, g. crimping the terminal 2 by surface-bearing on the upper surface 27 of the female piece 22 until this upper surface 27 is aligned with the upper surface 23 of the male piece 21 and the washers 31, 32 are axially and radially compressed, h. producing a weld continuous seam 28 by a welding S at the interface 28 between the male piece 21 and the female piece 22. This welding S may be laser or ultrasonic welding or any other welding means.

The invention is not limited to the examples which have been described above; it is particularly possible to combine with each other features from the illustrated examples within alternatives that have not been illustrated.

Other alternatives and improvements of the invention may be provided without necessarily departing from the scope of the invention.

Therefore, if in the illustrated examples, the through-terminal 2 is, preferably with an aluminum housing, a negative current output terminal, it may also be a positive terminal.

Moreover, if in the examples illustrated, the terminal 2 passes through the cover 62 of the housing 6, it may also pass through any other wall of the housing such as the bottom 63.

The electrochemical assembly may be packed together on the entire edge surface thereof.

It is possible to not have a weld line between edges of a same electrode.

Finally, if, in the illustrated examples, the arrangement of the male piece 21 in female piece 22 is such that the ends thereof define a planar surface, i.e. with a substantially zero height difference therebetween, it is also possible to provide a height difference therebetween which exists but is preferably less than 0.3 mm, whether the male piece projects or is retracted with respect to the female piece. Such an arrangement with a difference in height that is extremely small, or non-existent, firstly helps with the welding of the two male and female pieces with each other and secondly with the subsequent weld of the connection external to the accumulator.

The invention claimed is:

1. A lithium electrochemical accumulator including:
   at least one electrochemical cell made up of at least an anode and a cathode on either side of an electrolyte with which a separator is impregnated, the at least one electrochemical cell defining an electrochemical assembly having an elongated shape along a longitudinal axis with, at one of the lateral ends thereof, uncoated strips of the anode and, at the other of the lateral ends thereof, uncoated strips of the cathode; at least some of the uncoated strips of the anode or of the cathode of the electrochemical assembly being packed together while forming a base;
   a housing arranged to contain, in a sealed manner, the electrochemical assembly,
   two current output terminals each connected to either of the at least one anode or of the at least one cathode, one of the terminals called the first terminal passing through a through-hole of a wall of the housing and being electrically insulated therefrom, wherein the first terminal includes a first conducting piece passing through the housing and including a portion, at least one area of which is directly welded on the base, said first conducting piece being monolithic.

2. The electrochemical accumulator as claimed in claim 1, wherein a second terminal is welded to the housing.

3. The electrochemical accumulator as claimed in claim 1, wherein
   the first terminal includes a female second conducting piece,
   the first conducting piece is male,
   the accumulator includes two electrically insulating joints in the form of washers, each including a bearing portion surface-bearing with pressure against one of the faces of the wall of the housing and a guide portion projecting with respect to the bearing portion, the guide portion bearing with pressure against a rim of the through-hole of the wall,
   the male piece is press-fitted into the female piece, each of the conducting pieces including a bearing portion surface-bearing with pressure against the bearing portion of the washers, the female piece furthermore surface-bearing with pressure against the guide portions of the washers.

4. The accumulator as claimed in claim 3, wherein the male and female pieces are welded together by a weld continuous seam.

5. The accumulator as claimed in claim 1, wherein the portion is welded to the base by an area of the first conducting piece of lesser thickness with respect to all other areas of said piece.

6. The accumulator as claimed in claim 5, wherein the area of lesser thickness is an outer peripheral area of the first conducting piece.

7. The accumulator as claimed in claim 5, wherein the area of lesser thickness is an annular peripheral recess.

8. The accumulator as claimed in claim 1, wherein the portion is welded onto the base by laser transmission.

9. The accumulator as claimed in claim 1, wherein the terminals are made of copper or nickel-plated copper.

10. The accumulator as claimed in claim 1, wherein the uncoated strips of a same electrode are connected to each other by at least a weld radial to an axis of the assembly.

11. The accumulator as claimed in claim 1, wherein the electrochemical assembly is obtained by winding, the first terminal being welded on the winding axis of the electrochemical assembly.

12. The accumulator as claimed in claim 1, wherein the electrochemical assembly is obtained by winding, the terminal being welded midway between the winding axis of the electrochemical assembly and the outer periphery of the electrochemical assembly.

13. The accumulator as claimed in claim 1 wherein the accumulator has a generally cylindrical shape.

14. The accumulator as claimed in claim 1, wherein the accumulator has a generally prismatic shape.

15. The accumulator as claimed in claim 1, wherein the materials and the dimensions of the first and second conducting pieces are chosen to allow the flow of a current having an intensity equal to or greater than 250 A.

16. A method of producing an electrochemical accumulator as claimed in claim 1, according to which the following steps are carried out:
   a. axially packing together, along an axis of the electrochemical assembly, at least some of the uncoated strips of a same electrode of the electrochemical assembly in order to create the base,
   b. positioning the first conducting piece of the first terminal directly on the base,
   c. welding the first conducting piece directly to the base.

17. A method of producing an electrochemical accumulator comprising:
   at least one electrochemical cell made up of at least an anode and a cathode on either side of an electrolyte with which a separator is impregnated, the at least one electrochemical cell defining an electrochemical assembly having an elongated shape along a longitudinal axis with, at one of the lateral ends thereof, uncoated strips of the anode and, at the other of the lateral ends thereof, uncoated strips of the cathode; at least some of the uncoated strips of the anode or of the cathode of the electrochemical assembly being packed together while forming a base;
   a housing arranged to contain, in a sealed manner, the electrochemical assembly,
   two current output terminals each connected to either of the at least one anode or of the at least one cathode, one of the terminals called the first terminal passing through a through-hole of a wall of the housing and being electrically insulated therefrom,
   wherein the first terminal includes a first conducting piece passing through the housing and including a portion, at least one area of which is directly welded on the base, said first conducting piece being monolithic, and
   wherein the first terminal includes a female second conducting piece; and
wherein the method of producing comprises the following steps:
   a. axially packing together, along an axis of the electrochemical assembly, at least some of the uncoated strips of a same electrode of the electrochemical assembly in order to create the base,
   b. positioning the first conducting piece of the first terminal directly on the base,
   c. welding the first conducting piece directly to the base,
   d. positioning two electrically insulating joints in the form of washers on either side of a hole passing through the wall of the housing, each washer having a hole,
   e. positioning the second piece of the first terminal through the holes of the washers and the through-hole of the wall of the housing,
   f. force-fitting a unit made up of the wall, the second piece and the washers on the first conducting piece,
   g. crimping the first terminal by surface-bearing on an upper surface of the second piece until said upper surface of the second piece is aligned with an upper surface of the first conducting piece passing through the housing and the washers are axially and radially compressed,
   h. producing a weld continuous seam between the first conducting piece and the second piece.

18. The accumulator as claimed in claim 5, wherein the area of the first conducting piece of lesser thickness with respect to all other areas of said piece has a thickness e between 0.1 and 0.8 mm, and a width 1 between 0.3 and 2 mm.

* * * * *